United States Patent
Tanaka (10) Patent No.: US 8,054,309 B2
(45) Date of Patent: Nov. 8, 2011

(54) GAME MACHINE, GAME MACHINE CONTROL METHOD, AND INFORMATION STORAGE MEDIUM FOR SHADOW RENDERING

(75) Inventor: Toshiyuki Tanaka, Saitama (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 651 days.

(21) Appl. No.: 12/162,216

(22) PCT Filed: Dec. 18, 2006

(86) PCT No.: PCT/JP2006/325183
§ 371 (c)(1),
(2), (4) Date: Jul. 25, 2008

(87) PCT Pub. No.: WO2007/086209
PCT Pub. Date: Aug. 2, 2007

(65) Prior Publication Data
US 2009/0009515 A1    Jan. 8, 2009

(30) Foreign Application Priority Data
Jan. 26, 2006  (JP) .................... 2006-018105

(51) Int. Cl.
*G06T 15/50* (2011.01)
(52) U.S. Cl. ..................................... 345/426
(58) Field of Classification Search .......... None
See application file for complete search history.

(56) References Cited

U.S. PATENT DOCUMENTS

| 5,774,276 | A | * | 6/1998 | Inadome ............... 359/699 |
| 2003/0003992 | A1 | | 1/2003 | Furuya |
| 2003/0032483 | A1 | | 2/2003 | Mifune et al. |
| 2003/0216175 | A1 | * | 11/2003 | Osako et al. .......... 463/31 |

FOREIGN PATENT DOCUMENTS

| EP | 1235187 A1 | 8/2002 |
| JP | 09047576 A | 2/1997 |
| JP | 2001-101445 A | 4/2001 |
| JP | 2005-342120 A | 12/2005 |
| TW | 553756 B | 9/2003 |

OTHER PUBLICATIONS

Jonathan Blow, Unified Rendering Level of Detail, Part 2, Jan. 16, 2004, pp. 1-4.

(Continued)

*Primary Examiner* — Said Broome
*Assistant Examiner* — Janice Kau
(74) *Attorney, Agent, or Firm* — Sughrue Mion, PLLC (57) ABSTRACT

To provide a game machine for displaying a picture in which light from a light source causes the shadow of an object, and the shadow varies according to a change in the position of the light source, the shape (posture) of the object, and so forth, while reducing a processing load. The present invention relates to a game machine for showing a picture obtained by viewing, from a predetermined viewpoint, a virtual three dimensional space where a light source and an object are placed. According to the present invention, a shadow rendering object for rendering a shadow of the object is placed. The permeability of each of the vertexes of polygons forming the shadow rendering object is determined based on the position of the light source and the position and shape data of the object, and the game screen image is produced based on the permeability determined. The number of polygons forming the shadow rendering object is controlled based on the distance between the viewpoint and the object.

3 Claims, 7 Drawing Sheets

OTHER PUBLICATIONS

Stephen White (Naughty Dog), The Technology of Jak & Daxter, 2003, XP001543361, pp. 1-33.
Naga K. Govindaraju, et al., Ineractive Shadow Generation in Complex Environments, XP-002512686, pp. 1-10.

Japanese Office Action issued in Japanese Application No. 2006-018105 dated May 31, 2011.
Chinese Office Action dated Mar. 15, 2011, corresponding to Chinese Patent Application No. 200680051897.4.

* cited by examiner

VERTEX P0 : (COLOR, ALPHA VALUE) = (BLACK, 0)
VERTEX P1 : (COLOR, ALPHA VALUE) = (BLACK, 255)
VERTEX P2 : (COLOR, ALPHA VALUE) = (BLACK, 255)
VERTEX P3 : (COLOR, ALPHA VALUE) = (BLACK, 255)
VERTEX P4 : (COLOR, ALPHA VALUE) = (BLACK, 0)

FIG.4

| DISTANCE d BETWEEN VIRTUAL CAMERA AND CHARACTER OBJECT | DIVISION NUMBER nx | DIVISION NUMBER ny |
|---|---|---|
| $0 \leq d < D1$ | N1 | N4 |
| $D1 \leq d < D2$ | N2 | N5 |
| $D2 \leq d$ | N3 | N6 |

VERTEX P0 : (COLOR, ALPHA VALUE) = (BLACK, 0)
VERTEX P1 : (COLOR, ALPHA VALUE) = (BLACK, 255)
VERTEX P2 : (COLOR, ALPHA VALUE) = (BLACK, 175)
VERTEX P3 : (COLOR, ALPHA VALUE) = (BLACK, 128)
VERTEX P4 : (COLOR, ALPHA VALUE) = (BLACK, 0)

FIG.9

GAME MACHINE, GAME MACHINE CONTROL METHOD, AND INFORMATION STORAGE MEDIUM FOR SHADOW RENDERING

TECHNICAL FIELD

The present invention relates to a game machine, a game machine control method, and an information storage medium.

BACKGROUND ART

A related art game machine displays a picture obtained by viewing, from a predetermined viewpoint, a virtual three dimensional space where a field object representative of a ground surface and so forth and various objects representative of game characters and so forth placed on the field object are placed, and carries out a so-called three dimensional game.
Patent Document 1: Japanese Patent Laid-open Publication No. 2005-342120

DISCLOSURE OF THE INVENTION

Problem to be Solved by the Invention

In the above described game machine, by rendering a picture in which the light from the light source provided in the virtual three dimensional space causes the shadows of the various objects on the field object, and the shadow varies according to a change in the position of the light source, the shape (posture) of the object, and so forth, the reality of the game can be improved. In realizing the above-described shadow rendering, reduction of a processing load for shadow rendering is required so that processing for the main part of the game is not hindered.

The present invention has been conceived in view of the above, and one of the objects thereof is to provide a game machine, a game machine control method, and an information storage medium for showing a picture in which the light from a light source causes the shadow of an object, and the shadow varies according to a change in the position of the light source, the shape (posture) of the object, and so forth, while reducing a processing load.

Means for Solving the Problem

In order to achieve the above described object, according to one aspect of the present invention, there is provided a game machine for showing a game screen image showing a picture obtained by viewing, from a predetermined viewpoint, a virtual three dimensional space where a light source and an object are placed, comprising shadow rendering object placing means for placing a shadow rendering object for rendering a shadow of the object in the virtual three dimensional space; permeability determination means for determining permeability of each of vertexes of polygons forming the shadow rendering object, based on a position of the light source, a position of the object, and shape data about the object; and display control means for producing the game screen image based on the permeability determined by the permeability determination means, and displaying, wherein the shadow rendering object placing means includes polygon number control means for controlling a number of polygons forming the shadow rendering object, based on a distance between the viewpoint and the object.

According to another aspect of the present invention, there is provided a control method for controlling a game machine for showing a game screen image showing a picture obtained by viewing, from a predetermined viewpoint, a virtual three dimensional space where a light source and an object are placed, comprising a shadow rendering object placing step of placing a shadow rendering object for rendering a shadow of the object in the virtual three dimensional space; a permeability determination step of determining permeability of each of vertexes of polygons forming the shadow rendering object, based on a position of the light source, a position of the object, and shape data about the object; and a display control step of producing the game screen image based on the permeability determined at the permeability determination step, and displaying, wherein the shadow rendering object placing step includes a polygon number control step of controlling a number of polygons forming the shadow rendering object, based on a distance between the viewpoint and the object.

According to another aspect of the present invention, there is provided a program for causing a computer, including a consumer game machine, a portable game machine, a commercial game machine, a portable phone, a personal digital assistant (PDA), a personal computer, and so forth, to function as a game machine for showing a game screen image showing a picture obtained by viewing, from a predetermined viewpoint, a virtual three dimensional space where a light source and an object are placed, comprising shadow rendering object placing means for placing a shadow rendering object for rendering a shadow of the object in the virtual three dimensional space; permeability determination means for determining permeability of each of vertexes of polygons forming the shadow rendering object, based on a position of the light source, a position of the object, and shape data about the object; and display control means for producing the game screen image based on the permeability determined by the permeability determination means, and displaying, wherein the shadow rendering object placing means includes polygon number control means for controlling a number of polygons forming the shadow rendering object, based on a distance between the viewpoint and the object.

According to another aspect of the present invention, there is provided a computer readable information storage medium which stores the above-described program. There is also provided a program distribution device having an information storage medium which stores the above described program, reading the above described program from the information storage medium, and distributing the read program. There is also provided a program distribution method for, while using an information storage medium which stores the above described program, reading the above described program from the information storage medium, and distributing the read program.

The present invention relates to a game machine for showing a game screen image showing a picture obtained by viewing, from a predetermined viewpoint, a virtual three dimensional space where a light source and an object are placed. In the present invention, a shadow rendering object for rendering a shadow of the object is placed in the virtual three dimensional space. The permeability of each of the vertexes of the polygons forming the shadow rendering object is determined based on the position of the light source and the position and shape data of the object. Then, a game screen image is produced based on the permeability determined, and displayed. In particular, according to the present invention, the number of polygons forming the shadow rendering object is controlled based on the distance between the viewpoint and the object. According to the present invention, a picture in which the light from the light source causes the shadow of the object, and the shadow varies according to a change in the position of the light source and the shape (posture) of the object, can be shown while reducing the processing load.

BEST MODE FOR CARRYING OUT THE INVENTION

In the following, one example of an embodiment of the present invention will be described in detail with reference to the accompanying drawings.

Figure 1:
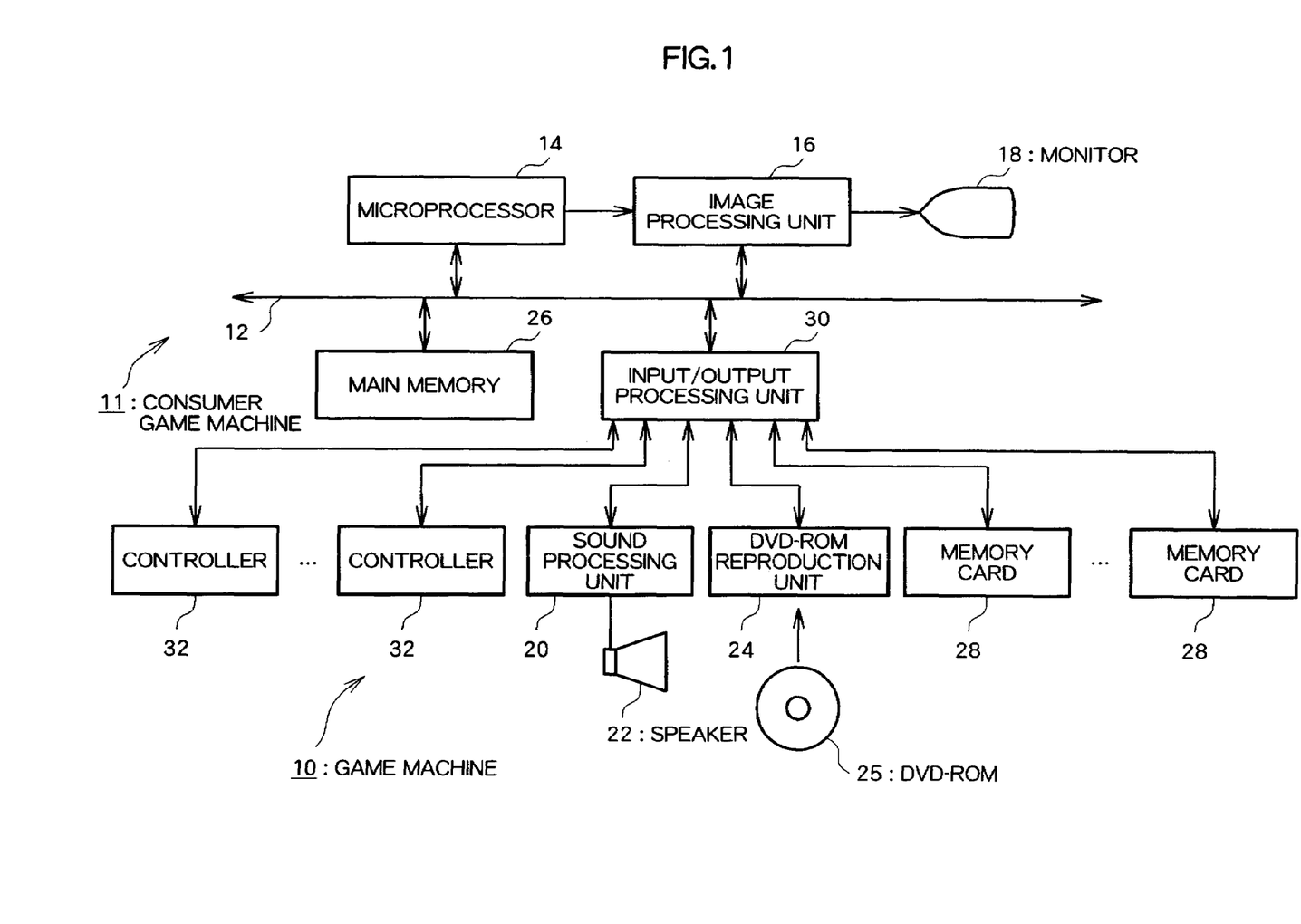
FIG. 1 is a diagram showing a hardware structure of a game machine according to this embodiment.

FIG. 1 is a diagram showing a hardware structure of a game machine according to an embodiment of the present invention. The shown game machine 10 comprises a consumer game machine 11 having a DVD-ROM 25 and a memory card 28, or information storage media, mounted thereto and a monitor 18 and a speaker 22 connected thereto. For example, the monitor 18 may be a home-use television set receiver, and the speaker 22 may be a built-in speaker thereof.

The consumer game machine 11 is a publicly known computer game system comprising a bus 12, a microprocessor 14, an image processing unit 16, a sound processing unit 20, a DVD-ROM reproduction unit 24, a main memory 26, an input/output processing unit 30, and a controller 32. The respective structural elements other than the controller 32 are accommodated in an enclosure.

The bus 12 is used for exchanging an address and/or data among the respective units of the consumer game machine 11. The microprocessor 14, the image processing unit 16, the main memory 26, and the input/output processing unit 30 are mutually connected via the bus 12 for data exchange.

The microprocessor 14 controls the respective units of the consumer game machine 11, based on an operation system stored in a ROM (not shown), a program read from the DVD-ROM 25, and data read from the memory card 28. The main memory 26 comprises a RAM, for example, into which a program read from the DVD-ROM 25 and/or data read from the memory card 28 is written when required. The main memory 26 is used also as a working memory of the microprocessor 14.

The image processing unit 16, which comprises a VRAM, renders a game screen image into the VRAM, based on the image data received from the microprocessor 14, then converts the content of the rendered game screen image into a video signal, and outputs the video signal to the monitor 18 at a predetermined timing.

The input/output processing unit 30 is an interface via which the microprocessor 14 accesses the sound processing unit 20, the DVD-ROM reproduction unit 24, the memory card 28, and the controller 32. The sound processing unit 20, the DVD-ROM reproduction unit 24, the memory card 28, and the controller 32 are connected to the input/output processing unit 30.

The sound processing unit 20, which comprises a sound buffer, reproduces and outputs, via the speaker 22, various sound data, such as game music, game sound effects, a message, and so forth, read from the DVD-ROM 25 and stored in the sound buffer.

The DVD-ROM reproduction unit 24 reads a program from the DVD-ROM 25 according to an instruction sent from the microprocessor 14. It should be noted that although the DVD-ROM 25 is used here to provide a program to the consumer game machine 11, any other information storage medium, such as a CD-ROM, a ROM card, or the like, may be used instead. Alternatively, a program may be provided via a data communication network, such as the Internet or the like, from a remote place to the consumer game machine 11.

The memory card 28 comprises a nonvolatile memory (for example, EEPROM, or the like). The consumer game machine 11 has a plurality of memory card slots defined therein each for accepting a memory card 28 so that a plurality of memory cards 28 can be inserted into the consumer game machine 11 at the same time. The memory card 28 is removable from the slot and stores various game data, such as saved data or the like.

The controller 32 is a general purpose operation input means via which the player inputs various game operations. The input/output processing unit 30 scans the states of the respective units of the controller 32 in a constant cycle (for example, every $\frac{1}{60}^{th}$ of a second) and sends an operation signal about the scanning result to the microprocessor 14 via the bus 12. The microprocessor 14 determines the game operation carried out by the player, based on the operation signal. The consumer game machine 11 is adapted to connection to a plurality of controllers 32. The microprocessor 14 controls a game, based on the operation signals input from the respective controllers 32.

Figure 2:
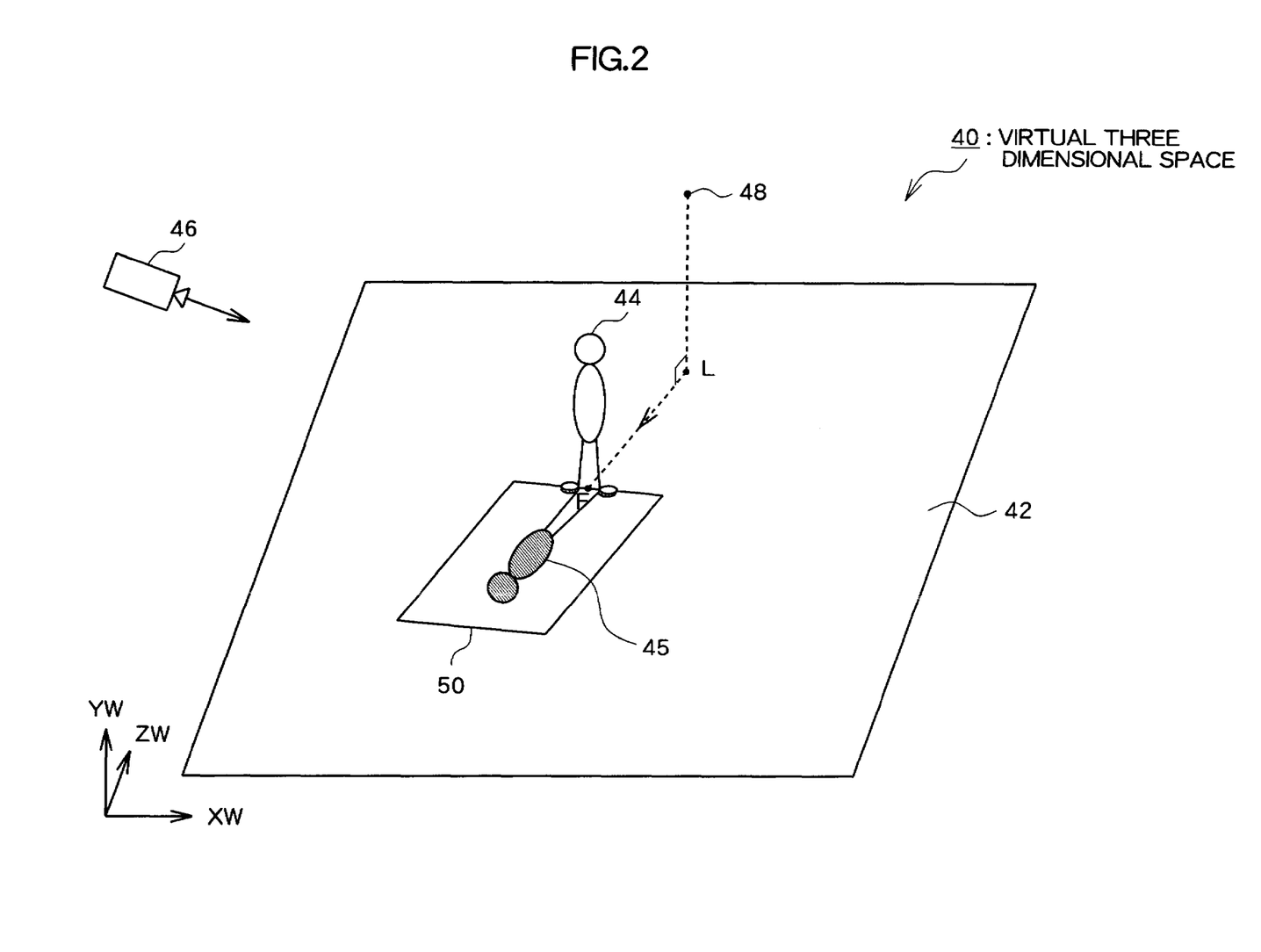
FIG. 2 is a diagram showing one example of a virtual three dimensional space.

In the game machine 10, a virtual three dimensional space (a virtual three dimensional game space) is created in the main memory 26. FIG. 2 shows a part of the virtual three dimensional space created in the main memory 26. As shown, a field object 42 (a first object) is placed in the virtual three dimensional space 40. The field object 42 is an object representative of a ground surface, a floor, and so forth, for example. A character object 44 (a second object, or an object having a shadow) is placed on the field object 42. The state (including a position, a shape (posture), and so forth) of the character object 44 is changed according to an operation carried out relative to the controller 32, for example.

A virtual camera 46 is set in the virtual three dimensional space 40. A game screen image showing a picture obtained by viewing, the virtual three dimensional space 40 from the virtual camera 46 is produced and displayed on the monitor 18.

A light source 48 is set in the virtual three dimensional space 40. In the following, a technique for preferably expressing a picture in which the light from the light source 48 causes the shadow 45 of the character object 44 on the field object 42 and the shadow 45 varies according to a change in the position of the light source 48, the state of the character object 44, and so forth, will be described.

Figure 3:
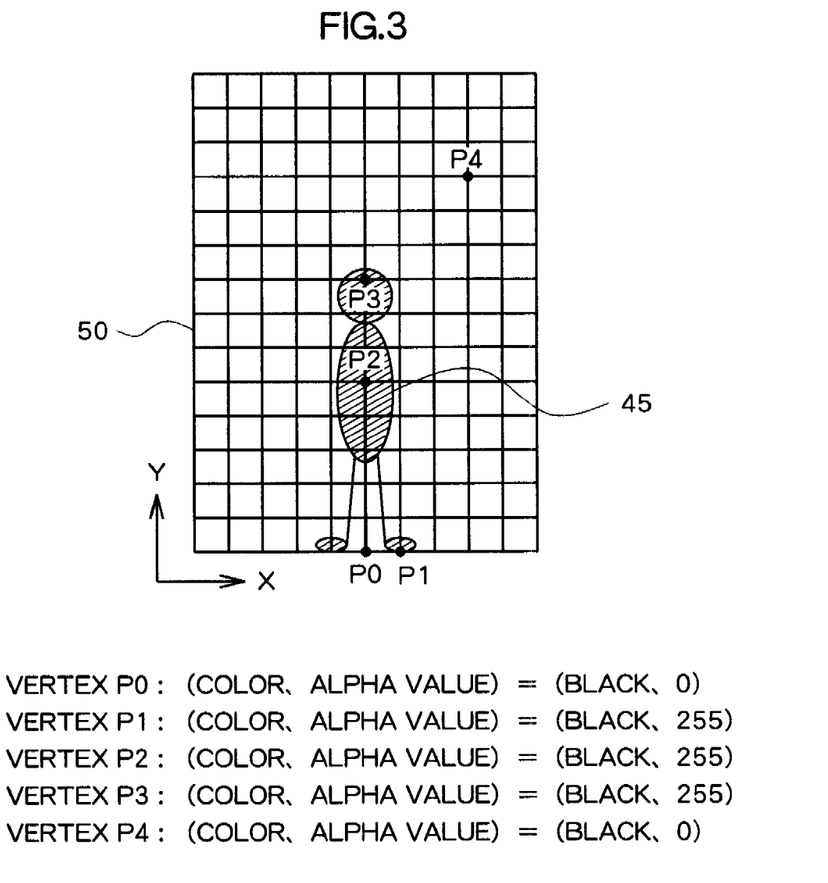
FIG. 3 is a diagram showing one example of a shadow rendering object.

With the game machine 10, in order to express the shadow 45 of the character object 44, a shadow rendering object 50 is placed in the virtual three dimensional space 40. FIG. 3 shows one example of the shadow rendering object 50. The shadow rendering object 50 is a panel-like rectangular object smaller than the field object 42. The shadow rendering object 50 is divided into polygons which are fine enough to express the shadow 45 of the character object 44 and finer than those forming the field object 42. It should be noted that finer expression of the shadow 45 of the character object 44 requires the shadow rendering object 50 to be divided into finer polygons, and thus expression of the shadow 45 such as is shown in FIG. 3 requires the shadow rendering object 50 to be divided into finer polygons than those shown in FIG. 3.

The shadow rendering object 50 is placed overlapping a part of the field object 42, the part being determined based on the position of the character object 44. That is, the position at which to place the shadow rendering object 50 is determined based on the current position of the character object 44, and the shadow rendering object 50 moves according to movement of the character object 44. In this embodiment, the position at which to place the shadow rendering object 50 is determined such that the position of the representative vertex P0 of the shadow rendering object 50 coincides with the foot position F of the character object 44.

The orientation (posture) of the shadow rendering object 50 is determined based on the positions of the character object 44 and light source 48. In this embodiment, the orientation of the shadow rendering object 50 is determined such that the reference direction (the Y axial direction in FIG. 3 in this embodiment) of the shadow rendering object 50 coincides with the direction from the position L, where the position of the light source 48 is orthogonally projected onto the field object 42, to the foot position F of the character object 44. That is, the orientation of the shadow rendering object 50 varies according to a change (change in the XW or ZW axial direction) in the relative positional relation between the character object 44 and the light source 48.

The shadow rendering object 50 may be placed slightly floating above the field object 42 or at the same height (the YW axial coordinates) as that of the field object 42. In the latter case, the game screen image is produced by first rendering the field object 42, and then the shadow rendering object 50.

The colors (an RGB value, for example) of the respective vertexes of the polygons forming the shadow rendering object 50 are set as black (see the vertexes P0 to P4 in FIG. 3). The alpha values (a semi-transparent combination rate, permeability) of the respective vertexes of the polygons forming the shadow rendering object 50 are determined based on the positions of the character object 44 and light source 48, and so forth. Specifically, an area on the shadow rendering object 50, where the shadow 45 of the character object 44 is to be rendered (the portion with diagonal lines in FIG. 3, hereinafter referred to as a shadow area) is specified according to a publicly known algorithm, such as shadow volume and so forth, based on the position of the light source 48 and the position and shape data of the character object 44 and so forth. Then, the alpha value of a vertex outside the shadow area (see vertexes P0 and P4 in FIG. 3) is defined as a first predetermined value (0 in this embodiment), while that of a vertex inside the shadow area (see vertexes P1 to P3 in FIG. 3) is defined as a second predetermined value (255 in this embodiment), or a value other than the first predetermined value. In this embodiment, it is arranged such that any integer between 0 and 255 can be defined as the alpha value of each of the vertexes of the polygons forming the shadow rendering object 50. The alpha value being 0 means "a thoroughly transparent state", while the alpha value being 255 means "an absolutely opaque state". That is, a larger alpha value results in less transparency.

With the above-described shadow rendering object 50 placed in the virtual three dimensional space 40, an image obtained by combining an image showing a picture obtained by viewing, from the virtual camera 46, the field object 42 and an image showing a picture obtained by viewing, from the virtual camera 46, the shadow rendering object 50 in a semi-transparent manner based on the alpha values set for the respective vertexes of the shadow rendering object 50 appears on the game screen. As a result, a picture in which the character object 44 having the shadow 45 formed by the light from the light source 48 so as to extend on the field object 42 is shown on the game screen. Further, a picture in which the shadow 45 of the character object 44 varies according to a change in the position of the light source 48, the state of the character object 44, and so forth is shown on the game screen as the position and orientation of the shadow rendering object 50 and the alpha values of the respective vertexes of the shadow rendering object 50 are changed according to a change in the state of the character object 44 and the light source 48.

It should be noted that in the game machine 10, the number of polygons forming the shadow rendering object 50 is changed based on the distance between the position of the character object 44 and the position (the viewpoint position) of the virtual camera 46.

Figure 4:
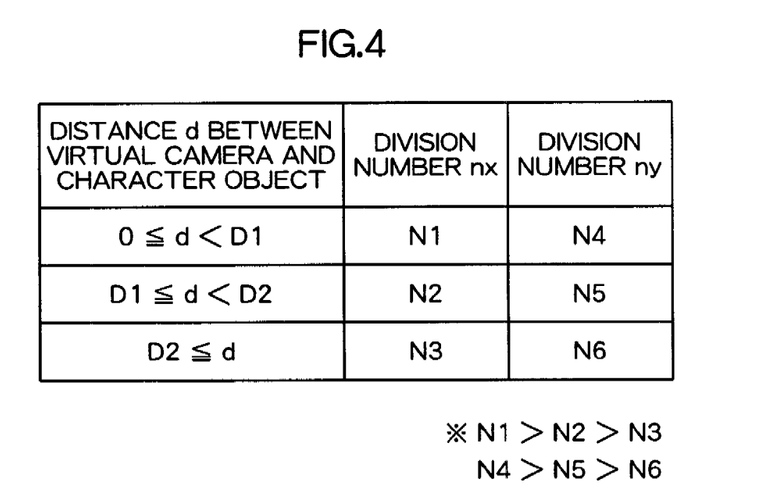
FIG. 4 is a diagram showing one example of a polygon number control table.

Specifically, in the game machine 10, a polygon number control table, such as is shown in FIG. 4, for example, is stored, and the number of polygons forming the shadow rendering object 50 is changed based on the polygon number control table. As shown, the polygon number control table shows correspondence between the range of the distance d between the character object 44 and the virtual camera 46 and the number of polygons (the polygon number, or the division number) forming the shadow rendering object 50. In FIG. 4, the division number nx stands for the number (a polygon number) into which the shadow rendering object 50 is divided in the x axial direction (see FIG. 3), while the division number ny stands for the number (a polygon number) into which the shadow rendering object 50 is divided in the Y axial direction (see FIG. 3). In the case of the shadow rendering object 50 shown in FIG. 3, for example, the division number nx is ten, while the division number ny is fourteen. The polygon number control table is defined such that the longer distance d results in the smaller division numbers nx and ny. That is, with the distance between the character object 44 and the virtual camera 46 becoming longer, the shadow 45 of the character object 44 appears so much smaller on the game screen that the roughly drawn shadow 45 of the character object 44 may not cause any problem on appearance. That is, a longer distance between the character object 44 and the virtual camera 46 can reduce the number of polygons forming the shadow rendering object 50 without causing a problem on appearance. The polygon number control table is defined such that the longer the distance between the character object 44 and the virtual camera 46, the fewer polygons there are forming the shadow rendering object 50. Alternatively, the division numbers nx and ny may be calculated through a predetermined calculation based on the distance d between the character object 44 and the virtual camera 46. In this arrangement, the polygon number control table is unnecessary. The number of polygons forming the shadow rendering object 50 may be changed as described above.

As the number of polygons forming the shadow rendering object 50 is changed based on the distance between the character object 44 and the virtual camera 46 in the game machine 10, as described above, for a case in which the distance between the character object 44 and the virtual camera 46 is relatively short, that is, when the shadow 45 of the character object 44 appears relatively large on the game screen, the shadow rendering object 50 is divided into finer polygons. In this case, a fine shadow 45 is shown for the character object 44 on the game screen. Meanwhile, for a case in which the distance between the character object 44 and the virtual camera 46 is relatively long, that is, when the shadow 45 of the character object 44 appears relatively small on the game screen, the shadow rendering object 50 is divided into rough polygons. In this case, the shadow 45 of the character object 44 is not finely expressed on the game screen, so that a processing load for the shadow rendering can be reduced.

Here, a process to be carried out by the game machine 10 will be described.

Figure 5:
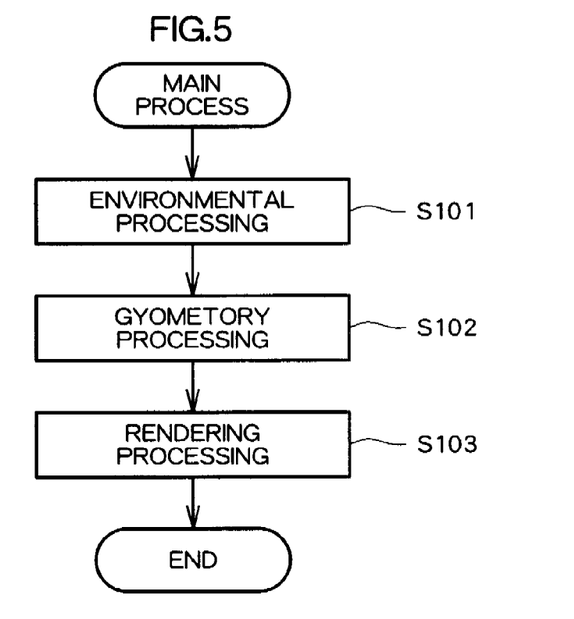
FIG. 5 is a flowchart of a main process to be carried out by the game machine.

FIG. 5 is a flowchart of a main process to be carried out in the game machine 10 every predetermined period of time (every $\frac{1}{60}^{th}$ of a second, for example). The shown process is realized by the microprocessor 14 by carrying out a program read from the DVD-ROM 25. As shown, in the game machine 10, environmental processing is initially carried out (S101). In the environmental processing, the positions and postures of all static and moving objects in the virtual three dimensional space 40 are calculated. A static object includes an object, such as a building or the like, whose position remains the same, while a moving object includes an object, such as a character object 44, or a target to be operated by the player, whose position and/or posture is changed.

In the environmental processing, the position, orientation, and angle of view of the virtual camera 46 are calculated. For example, the position (viewpoint coordinates) of the virtual camera 46 are determined based on the position of the character object 44 which is the target of operation by the player, so as to move according to a move of the character object 44. Also, the orientation (the sight line direction) of the virtual camera 46, for example, is determined so as to be directed to the representative point of the character object 44 which is the target of operation by the player. Further, the angle of view may have a fixed value, for example.

Thereafter, in the game machine 10, geometry processing is carried out (S102). In the geometry processing, coordinate conversion from the world coordinate system (XW, YW, ZW) to the viewpoint coordinate system, that is, a coordinate system having the viewpoint coordinates as the origin, is carried out. Further, color information about the vertex of the polygon forming each object is calculated based on the information (color and position of the light source 48) about the light source 48. Still further, clipping processing is carried out.

Thereafter, in the game machine 10, rendering processing is carried out (S103). Specifically, the microprocessor 14 forwards the vertex coordinates, vertex color information, texture coordinates, and so forth of each polygon within the image capturing range of the virtual camera 46 to the image processing unit 16, which in turn forms a game screen image in the VRAM, based on the information. The image is formed by converting the respective objects described in the viewpoint coordinate system into those described in the screen coordinate system. The thus formed image in the VRAM is output to the monitor 18 at a predetermined timing.

Figure 6:
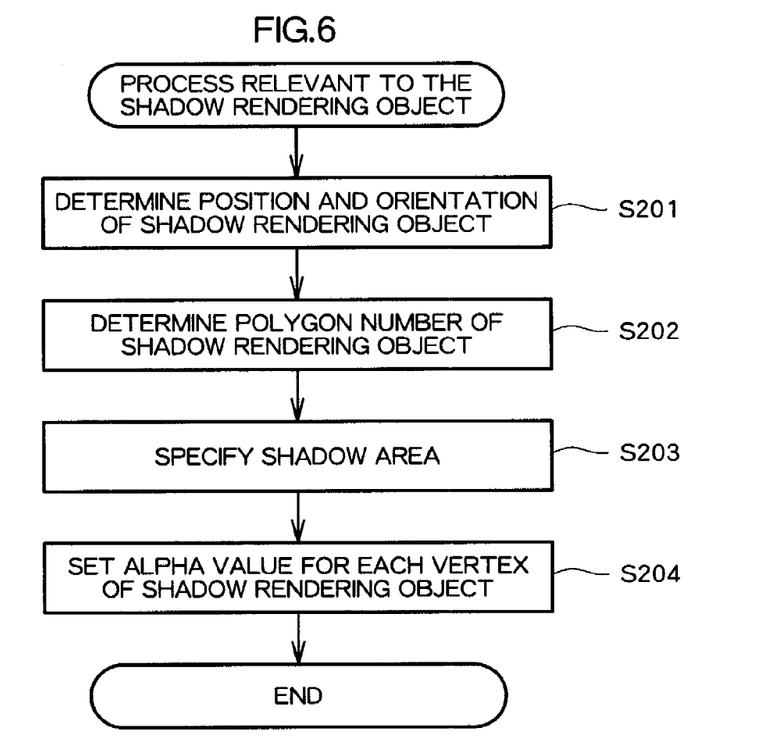
FIG. 6 is a flowchart of a process relevant to the shadow rendering object.

FIG. 6 is a flowchart showing a process particularly relevant to the shadow rendering object 50. This process is carried out as a part of the environmental processing (S101) and geometry processing (S102), for example. This process is carried out for each object having a shadow (character object 44).

As shown in the drawing, in the process relevant to the shadow rendering object 50, the position and orientation of the shadow rendering object 50 is determined (S201). The position of the shadow rendering object 50 is determined such that the position of the representative vertex P0 of the shadow rendering object 50 coincides with the foot position F of the character object 44. The orientation of the shadow rendering object 50 is determined such that the reference direction of the shadow rendering object 50 coincides with the direction from the position L, where the position of the light source 48 is orthogonally projected onto the field object 42, to the foot position F of the character object 44.

Thereafter, the number of polygons forming the shadow rendering object 50 is determined (S202). Here, the distance between the character object 44 and the virtual camera 46 is initially obtained. Then, while referring to the polygon number control table (FIG. 4), the values of the division numbers nx and ny corresponding to the range which includes the obtained distance are obtained. As described above, the division numbers of the shadow rendering object 50 as to the x and Y axial directions (see FIG. 3), respectively, are determined, and the number of polygons forming the shadow rendering object 50 is accordingly determined.

Then, a shadow area in the shadow rendering object 50 is specified (S203). Specifically, the shadow area in the shadow rendering object 50 is calculated according to a publicly known algorithm, such as shadow volume and so forth, for example, based on the position and orientation of the shadow rendering object 50, determined at S201, the position of the light source 48, the position and shape data of the character object 44, and so forth.

Thereafter, the alpha values of the respective vertexes of the polygons forming the shadow rendering object 50 are set (S204). That is, for each of the vertexes of the polygons forming the shadow rendering object 50, whether or not the vertex is located within the shadow area is determined, and an alpha value of the vertex is set based on the determination result. In this embodiment, the alpha value of a vertex within the shadow area is set as 255, while that of a vertex outside the shadow area is set as 0.

As described above, in the game machine 10, a picture in which the light from the light source 48 causes the shadow 45 of the character object 44 on the field object 42, and the shadow 45 varies according to a change in the position of the light source 48, the state of the character object 44, and so forth is displayed. The above described shadow rendering can be attained using the field object 42 divided into fine polygons. This, however, has a problem in that it results in a huge amount of data about the field object 42. The game machine 10 addresses this point by expressing the above-described shadow while suppressing an increase of the data amount.

In the game machine 10, the number of polygons forming the shadow rendering object 50 (in other words, the fineness of the polygons forming the shadow rendering object 50) is changed based on the distance between the character object 44 and the virtual camera 46. This arrangement enables the above-described shadow rendering in the game machine 10, while reducing a processing load.

When the light source 48 is located in a low position (that is, small YW axial coordinates), the shadow 45 of the character object 44 may be formed too long to be fully included in the shadow rendering object 50. In such a case, the shadow 45 of the character object 44 appears incomplete, which may give the player some sense of discomfort.

Figure 7:
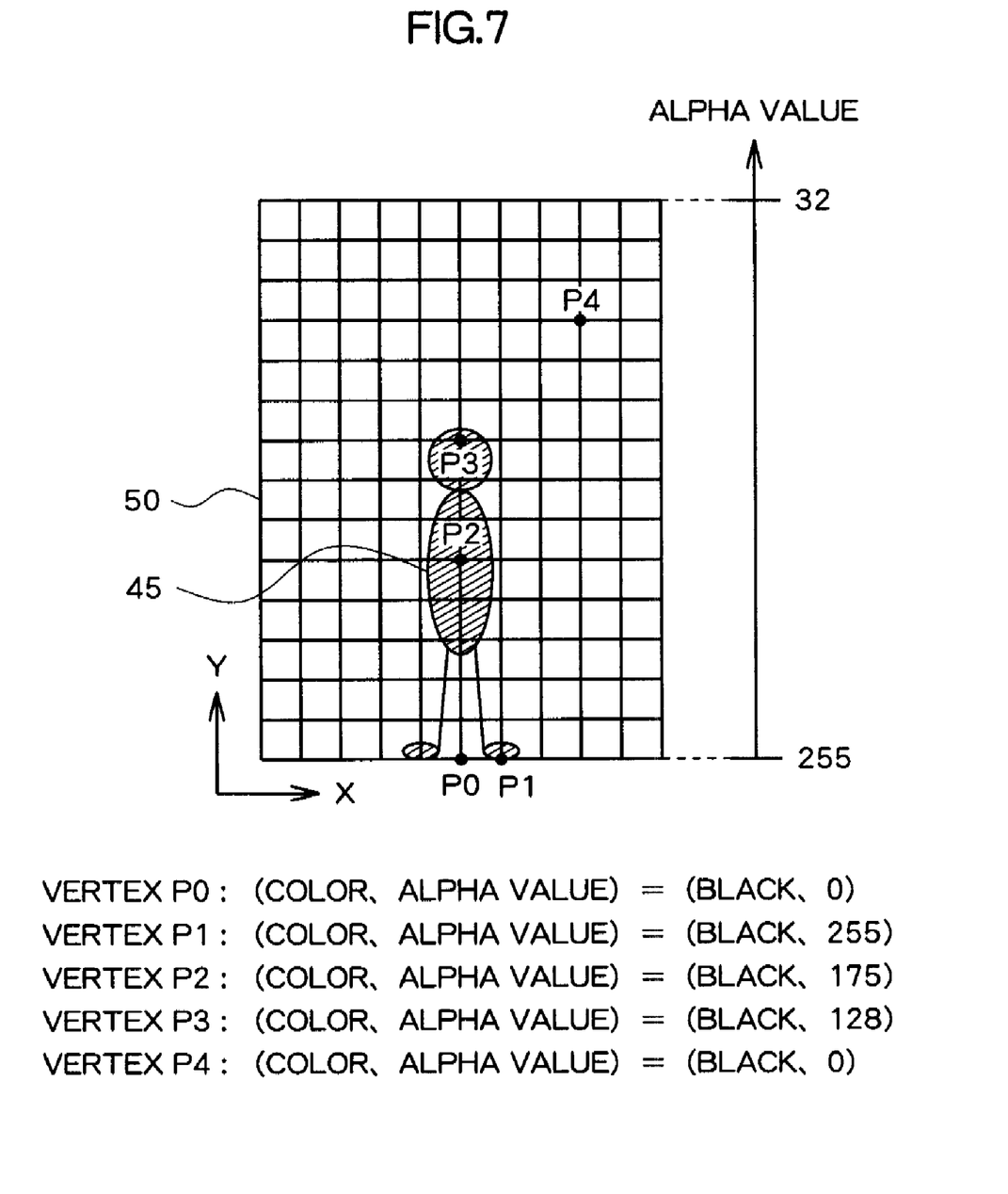
FIG. 7 is a diagram showing another example of the shadow rendering object.

To address the above, the alpha value of a vertex within the shadow area of the shadow rendering object 50 may be determined based on the distance from the character object 44, rather than as a fixed value (255, for example). For example, as shown in FIG. 7, the alpha value of a vertex within the shadow area of the shadow rendering object 50 may be determined so as to become smaller in a gradual or stepwise manner from a predetermined maximum value (255 in the example shown in FIG. 7) to a predetermined minimum value (32 in the example shown in FIG. 7) as the vertex goes farther away from the character object 44. This arrangement enables the shadow 45 of the character object 44 to be shown by gradation on the game screen. That is, the shadow 45 of the character object 44 is shown in a tone which becomes lighter in a gradual or stepwise manner going further away from the character object 44. As a result, the shadow 45 of the character object 44 appears more blurred going further away from the character object 44. This arrangement enables expression of the shadow 45 so as not to give a sense of discomfort to the player even when the shadow 45 of the character object 44 cannot be shown completely within the shadow rendering object 50. It should be noted that, in this case, the color (brightness) of the vertex within the shadow area of the shadow rendering object 50 may be changed in a gradual or stepwise manner as the shadow 45 goes away from the position of the character object 44 such that the shadow 45 of the character object 44 is shown by gradation on the game screen.

Alternatively, the length (the length in the Y axial direction in FIG. 3) of the shadow rendering object 50 may be changed based on the height (the YW axial coordinates) of the light source 48. That is, the shadow rendering object 50 having a length in accordance with the height of the light source 48 may be placed in the virtual three dimensional space 40. For example, a table which shows the correspondence between the range of the height of the light source 48 and the length of the shadow rendering object 50 may be stored, and the length of the shadow rendering object 50 may be determined referring to the table. Alternatively, the length of the shadow rendering object 50 may be determined through a predetermined calculation based on the height of the light source 48, for example. This arrangement can prevent the shadow 45 of the character object 44 from becoming too long to be fully included in the shadow rendering object 50, and thus giving the player the above described sense of discomfort.

It should be noted that the present invention is not limited to the above-described embodiment.

For example, two or more shadow rendering objects 50 may be provided with respect to one character object 44. For example, in the case where two or more light sources 48 are set in the virtual three dimensional space 40 and two or more shadows are accordingly formed with respect to one character object 44, a shadow rendering object 50 corresponding to each of the light sources 48 may be provided based on the positions of the light source 48 and the character object 44.

Figure 8:
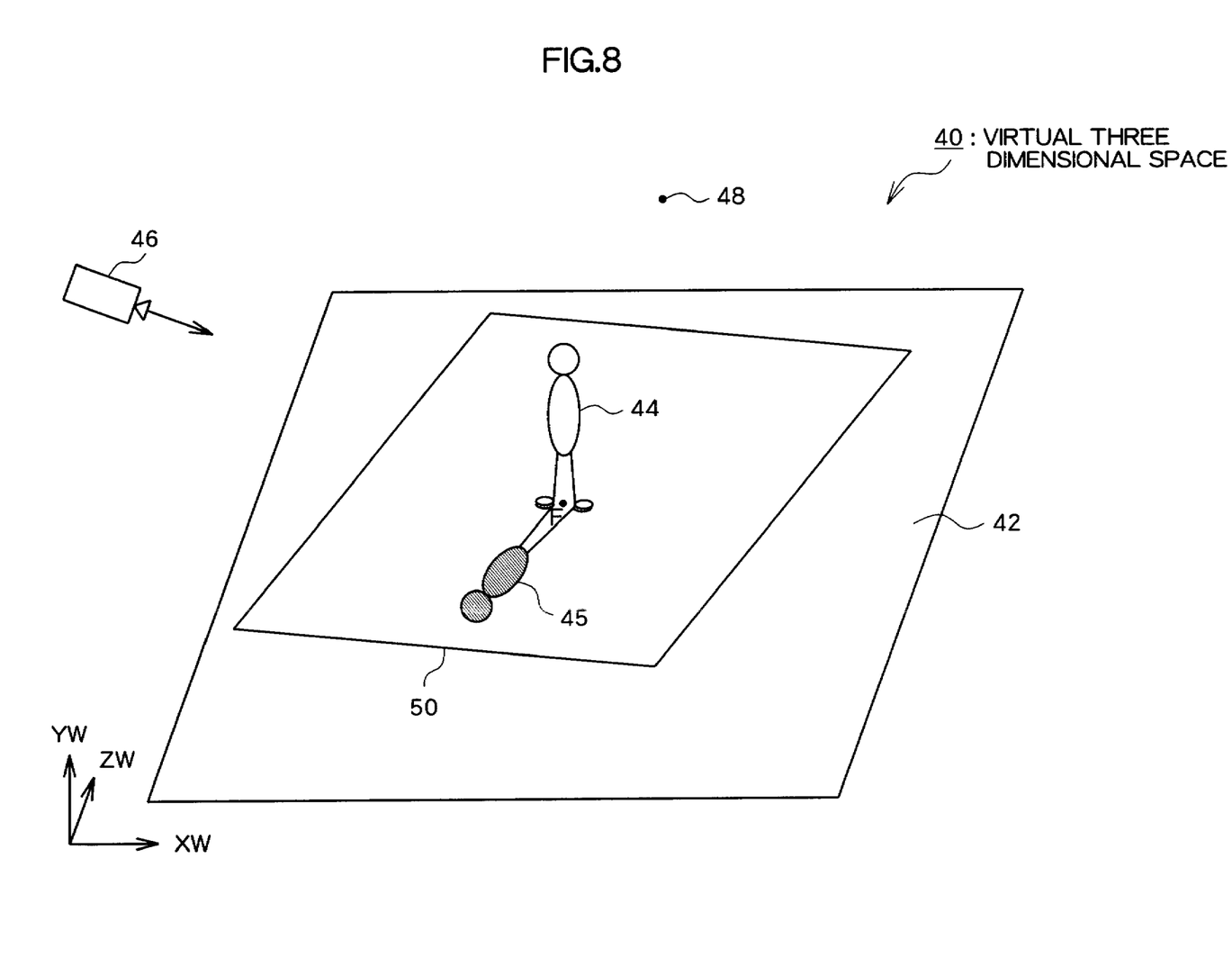
FIG. 8 is a diagram showing one example of the virtual three dimensional space.

Alternatively, the shadow rendering object 50 such as is shown in FIG. 8, for example, may be provided, though a larger shadow rendering object 50, compared to that in the above-described embodiment, will result. That is, a shadow rendering object 50 which can cover the entire area within a predetermined distance from the position of the character object 44 is provided such that the foot position F of the character object 44 coincides with the center of the shadow rendering object 50. With the above, even though change in the position of the light source 48 results in change in the relative positional relation between the light source 48 and the character object 44, the position where the shadow rendering object 50 is placed need not be changed. As a result, the position of the light source 48 need not be considered in determining a position at which to place the shadow rendering object 50.

Further, in order to cope with a case in which a plurality of character objects 44 having different heights (the length in the YW axial direction) are placed in the virtual three dimensional space 40, the length (the length in the Y axial direction in FIG. 3) of the shadow rendering object 50 may be stored in association with each character object 44. With the above, the length of the shadow rendering object 50 may be changed for each character object 44 according to the length of the character object 44. Alternatively, a table which shows the correspondence between the range of the height of the character object 44 and the length of the shadow rendering object 50 may be stored, and the length of the shadow rendering object 50 is changed for each character object 44 according to the height of the character object 44 with reference to the table.

It should be noted that an object which has a shadow to be formed is not limited to the character object 44, and any other kinds of objects, including a static object, such as a building or the like, can be similarly applicable.

Figure 9:
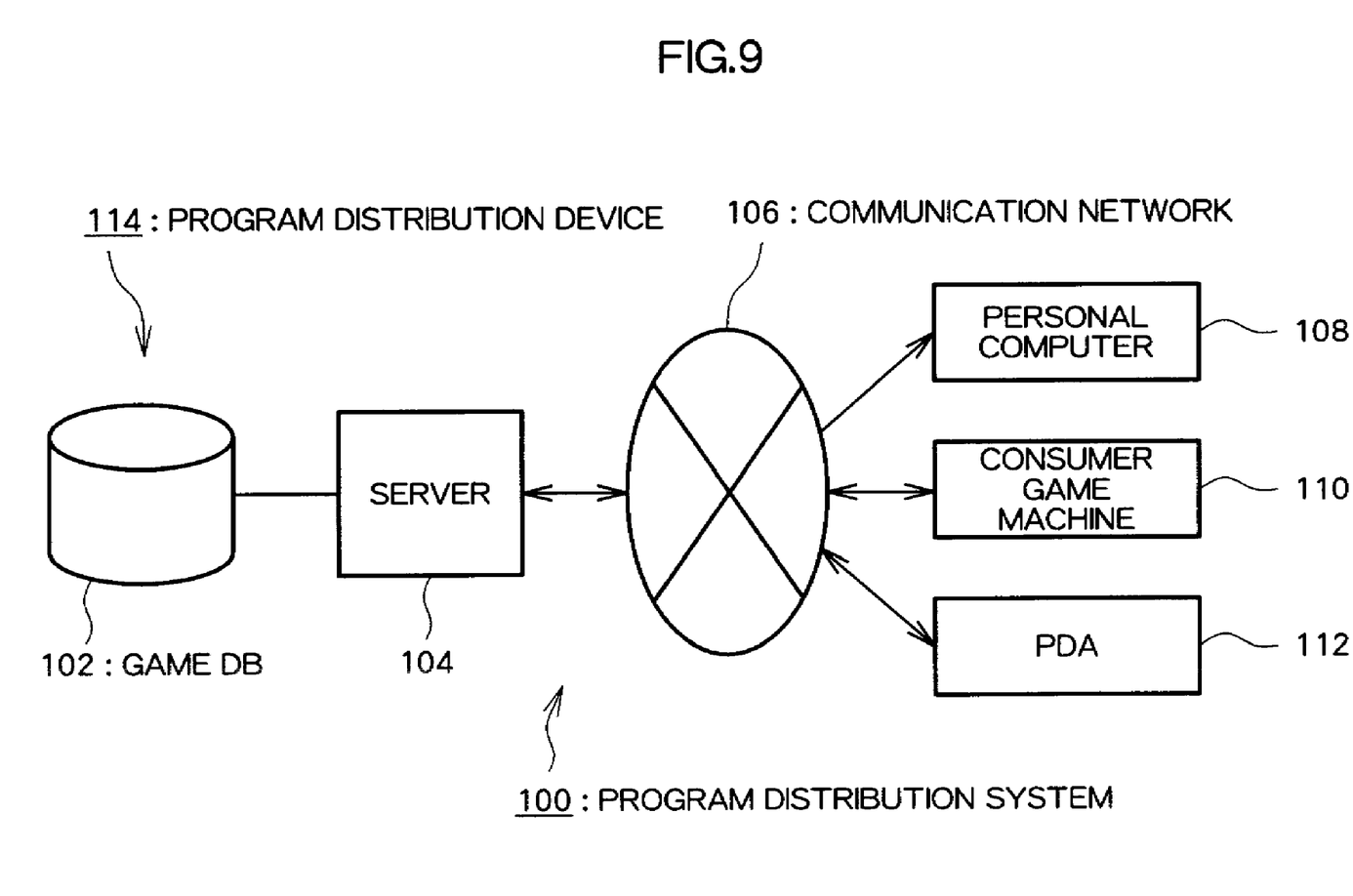
FIG. 9 is a diagram showing an entire structure of a program distribution system according to another embodiment of the present invention.

Further, although it is described in the above that a program is supplied from a DVD-ROM 25, or an information storage medium, to the consumer game machine 11, the program may alternatively be distributed via a communication network to a home or the like. FIG. 9 is a diagram showing an overall structure of a program distribution system using a communication network. Referring to FIG. 9, a program distribution method according to the present invention will be described. As shown, the program distribution system 100 comprises a game database 102, a server 104, a communication network 106, a personal computer 108, a consumer game machine 110, and a PDA (personal digital assistant) 112. The game database 102 and the server 104 together constitute a program distribution device 114. The communication network 106 comprises the Internet, a cable television network, or the like, for example. In this system, a program having the content identical to that stored in the DVD-ROM 25 is stored in the game database (an information storage medium) 102. A person wishing to obtain a game sends a game distribution request via the personal computer 108, the consumer game machine 110, the PDA 112, or the like, which is then transmitted via the communication network 106 to the server 104. Then, the server 104, in response to the game distribution request, reads the program from the game database 102, and sends the program read to the entity having requested the game distribution, such as the personal computer 108, the consumer game machine 110, the PDA 112, or the like. It should be noted that although it is arranged here that a game is distributed in response to a game distribution request, the server 104 may unidirectionally send a game. Further, simultaneous distribution of all program components necessary to realize a game (collective distribution) is unnecessary, and distribution of only a component necessary in each aspect of the game (divided distribution) is applicable instead. The above-described game distribution via the communication network 106 makes it possible for a person wishing to obtain the program to readily obtain the desired program.

The invention claimed is:

1. A game machine for showing a game screen image showing a picture obtained by viewing, from a predetermined viewpoint, a virtual three dimensional space where a light source and an object are placed, comprising:
   shadow rendering object placing means for placing a shadow rendering object for rendering a shadow of the object in the virtual three dimensional space, the shadow rendering object divided into a plurality of polygons;
   permeability determination means for determining permeability of each of vertexes of polygons forming the shadow rendering object, based on a position of the light source, a position of the object, and shape data about the object; and
   display control means for producing the game screen image based on the permeability determined by the permeability determination means, and displaying,
   wherein
   the shadow rendering object placing means includes polygon number control means for controlling a number of the polygons forming the shadow rendering object, based on a distance between the viewpoint and the object, and further wherein
   the shadow rendering object is planar, and that the plurality of polygons in the planar shadow rendering object is determined by reference to a polygon control table that comprises a first division number in a first axis and a second division number in a second axis, the first division number and the second division number decreasing as said distance increases.

2. A control method for controlling a game machine for showing a game screen image showing a picture obtained by viewing, from a predetermined viewpoint, a virtual three dimensional space where a light source and an object are placed, comprising:
   a shadow rendering object placing step of placing a shadow rendering object for rendering a shadow of the object in the virtual three dimensional space, the shadow rendering object divided into polygons;
   a permeability determination step of determining permeability of each of vertexes of polygons forming the shadow rendering object, based on a position of the light source, a position of the object, and shape data about the object; and
   a display control step of producing the game screen image based on the permeability determined at the permeability determination step, and displaying,
   wherein
   the shadow rendering object placing step includes a polygon number control step of controlling a number of the polygons forming the shadow rendering object, based on a distance between the viewpoint and the object, and further wherein
   the shadow rendering object is planar, and that the plurality of polygons in the planar shadow rendering object is determined by reference to a polygon control table that comprises a first division number in a first axis and a second division number in a second axis, the first division number and the second division number decreasing as said distance increases.

3. A non-transitory computer readable information storage medium
   storing a program for causing a computer to function as a game machine for showing a game screen image showing a picture obtained by viewing, from a predetermined viewpoint, a virtual three dimensional space where a light source and an object are placed, comprising:
   shadow rendering object placing means for placing a shadow rendering object for rendering a shadow of the object in the virtual three dimensional space, the shadow rendering object divided into polygons;
   permeability determination means for determining permeability of each of vertexes of polygons forming the shadow rendering object, based on a position of the light source, a position of the object, and shape data about the object; and
   display control means for producing the game screen image based on the permeability determined by the permeability determination means, and displaying,
   wherein
   the shadow rendering object placing means includes polygon number control means for controlling a number of the polygons forming the shadow rendering object, based on a distance between the viewpoint and the object, and further wherein
   the shadow rendering object is planar, and that the plurality of polygons in the planar shadow rendering object is determined by reference to a polygon control table that comprises a first division number in a first axis and a second division number in a second axis, the first division number and the second division number decreasing as said distance increases.

* * * * *